(12) United States Patent
Chau

(10) Patent No.: US 6,209,573 B1
(45) Date of Patent: Apr. 3, 2001

(54) WET BATTERY AND VEHICLE-BASED WATER MANAGEMENT SYSTEM

(76) Inventor: Chin Lye Chau, 4 Jalan Kanari, 14 A, Bandar Puchong Jaya, 47100 Selangor Darul Ehsan (MY)

( * ) Notice: Subject to any disclaimer, the term of this patent is extended or adjusted under 35 U.S.C. 154(b) by 0 days.

(21) Appl. No.: 09/089,756

(22) Filed: Jun. 2, 1998

(51) Int. Cl.⁷ .................................................. E01H 1/10
(52) U.S. Cl. .................... 137/351; 137/354; 137/340; 137/314; 137/334
(58) Field of Search .................... 429/63, 64, 72, 429/73, 74, 75, 76, 77; 137/351, 354, 340, 314, 334, 267; 62/244, 268

(56) References Cited

U.S. PATENT DOCUMENTS

| | | | | |
|---|---|---|---|---|
| 1,057,654 | * | 4/1913 | Menzl | 137/314 |
| 2,480,480 | * | 8/1949 | Keleher et al. | 137/314 |
| 3,599,869 | * | 8/1971 | Oberdorfer | 137/351 |
| 3,880,209 | | 4/1975 | Haughn et al. . | |
| 3,926,000 | * | 12/1975 | Scofield | 62/244 |
| 4,007,764 | | 2/1977 | Bandemor . | |
| 4,055,279 | * | 10/1977 | Lapera et al. | 137/354 |
| 4,140,150 | * | 2/1979 | Rundell | 137/340 |
| 4,359,071 | | 11/1982 | d'Arcy et al. . | |
| 4,454,896 | | 6/1984 | Barrett, Jr. et al. . | |
| 4,512,378 | | 4/1985 | Oschmann . | |
| 4,522,896 | | 6/1985 | Iseard . | |
| 4,845,954 | * | 7/1989 | Johansson | 62/268 |
| 5,261,254 | * | 11/1993 | Cattane | 62/244 |
| 5,421,169 | * | 6/1995 | Benedict | 62/244 |
| 5,453,334 | * | 9/1995 | Melichar | 429/64 |
| 5,497,918 | * | 3/1996 | Brilanchik | 137/351 |
| 5,539,383 | | 7/1996 | Chin . | |
| 5,545,967 | | 8/1996 | Osborne et al. . | |
| 5,555,907 | | 9/1996 | Philipp . | |
| 5,819,541 | * | 10/1998 | Tunkel et al. | 62/244 |
| 5,819,784 | * | 10/1998 | Yoon | 137/334 |

FOREIGN PATENT DOCUMENTS

| | | |
|---|---|---|
| 33 19 917 A1 | 12/1983 | (DE) . |
| 1197730 | 7/1970 | (GB) . |
| 57-027561 | 2/1982 | (JP) . |
| 58-106759 | 6/1983 | (JP) . |

* cited by examiner

Primary Examiner—A. Michael Chambers
Assistant Examiner—Thomas L. McShane
(74) Attorney, Agent, or Firm—Skinner and Associates

(57) ABSTRACT

A water management system for a motor vehicle in which water is collected from the condenser (1) of the air-conditioning unit, stored in a master water tank (5) and distributed therefrom to the battery (15), screen wash jet (27) and radiator (37). The vehicle owner is thus spared the inconvenience of regularly checking and topping up the water supply for these items. The risk of breakdown is also reduced. In another aspect of the invention, a wet battery (15) incorporates a plurality of float valves (75) for regulating the fluid level in respective cells (61, 63) of the battery. Water is passed through a common channel (23) into which the float valves (75) open when the fluid level is below a preset limit. The battery fluid is thereby automatically kept at the required level for optimum performance and lifetime of the battery.

4 Claims, 4 Drawing Sheets

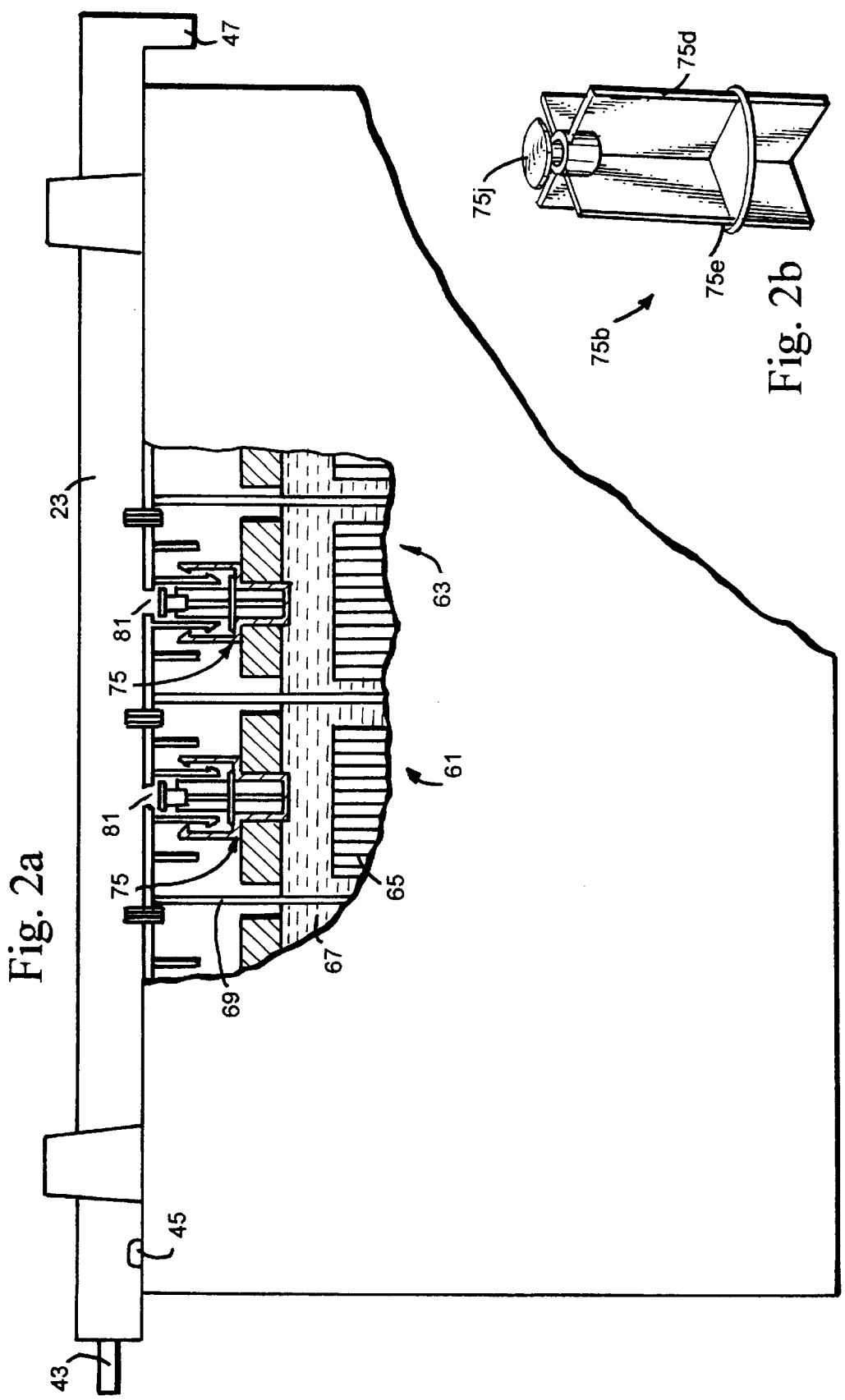

WET BATTERY AND VEHICLE-BASED WATER MANAGEMENT SYSTEM

BACKGROUND OF THE INVENTION

1. Field of the Invention

This invention relates to a wet battery which needs to be topped up periodically with water or other fluid. The invention also relates to a vehicle-based water management system for use in connection with at least one unit on the vehicle which requires water for its operation.

2. Description of the Prior Art

In a motor vehicle such as a car, there are a number of units which require water for their operation and in which the supply of water must be regularly checked and topped up if necessary. These units include the radiator, the screen wash and the battery. Water is lost from the radiator due to leakage and evaporation. Water is consumed in normal use of the screen wash. Water is lost from the battery through evaporation and boiling caused by heating of the battery during its charging and discharging cycle and due to the engine temperature. In an electric vehicle, the batteries constitute the source of motive power, so it is particularly important that they be maintained in good condition at all times.

Presently, the vehicle owner must routinely inspect and refill the water supply in all these units. This is an inconvenient and irritating burden, yet damage may result or safety be compromised if the task is not done. Additionally, the water level in the cells of the or each battery should be carefully adjusted in order to optimize the performance and lifespan. This is particularly important in the case of an electric car or other vehicle. However, getting the water level right requires some skill and knowledge. Moreover, the need to check and fill each cell individually is time-consuming.

The present invention arose partly from a consideration of these problems and how they may be overcome.

SUMMARY OF THE INVENTION

In one aspect, the invention provides a wet battery comprising a plurality of cells, each cell having a respective fluid inlet, the battery having a channel which is shared by the fluid inlets for supplying fluid such as water to the cells of the battery, wherein each cell includes a float valve associated with its fluid inlet and arranged to automatically open for communication with the channel when the fluid in the cell is below a predetermined level.

According to this aspect of the invention, the procedure of maintaining the fluid level of each cell of the battery is simplified and may be automatically regulated, thereby ensuring optimum performance and lifespan.

In a preferred embodiment, the battery has an integral reservoir for temporarily holding a quantity of water. The reservoir is periodically filled manually or automatically, and then empties its content through the channel, which supplies the cells as required. Any excess water exits the channel through an overflow or may even be returned to the reservoir. According to this arrangement, the fluid level is automatically set by the valves and it is impossible to overfill the battery.

In another aspect, the invention provides a water management system on a vehicle, the system comprising water collecting means for providing a supply of water and distribution means for distributing the water from the supply to a plurality of units on the vehicle which require water for their operation.

According to this other aspect of the invention, a supply of water is always conveniently available for use by the units requiring water for their operation. The plurality of units may consist of a bank of two or more batteries in the case of an electric vehicle.

The water collecting means may be a master or central storage vessel which is filled manually. However, the water collecting means may include a source which generates water as a by-product. In one embodiment of the invention, an air-conditioning system is employed to provide the water supply. The condensate formed on the condenser of the air-conditioning system offers a reliable and clean source of water. It is also simple to collect, for example by using the conventional drip pipe of the condenser to feed the condensed water into a storage tank.

The inventor has tested the system on his own car and found that one-half of a liter of water may be collected from the car's air-conditioner in one 30-minute city journey. This result indicates that more than a sufficient amount of water to meet the usual requirements of the radiator, screen wash and battery can be collected in this way. Thus, an adequate supply of water to those units may be guaranteed. A sample of the collected water was tested and found to have a pH value of 6.4, i.e. substantially neutral. This further demonstrates the fitness of the collected water.

The automatic supply of the collected water to the units means that the vehicle owner is spared the inconvenience of having to regularly check and top up the units. Thus, the maintenance effort is beneficially reduced and the risk of breakdown is lowered. The collected water may also be used to provide a supply of drinking or washing water within the car.

BRIEF DESCRIPTION OF THE DRAWINGS

The invention, in its various aspects, is illustrated, but not limited, by the following description of an embodiment, which refers to the accompanying drawings.

FIG. 2(a) shows an internal view of a wet battery in accordance with the invention;

FIG. 2(b) shows a component of the float valve of the battery of FIG. 2(a);

DETAILED DESCRIPTION OF THE PREFERRED EMBODIMENTS

Figure 1:
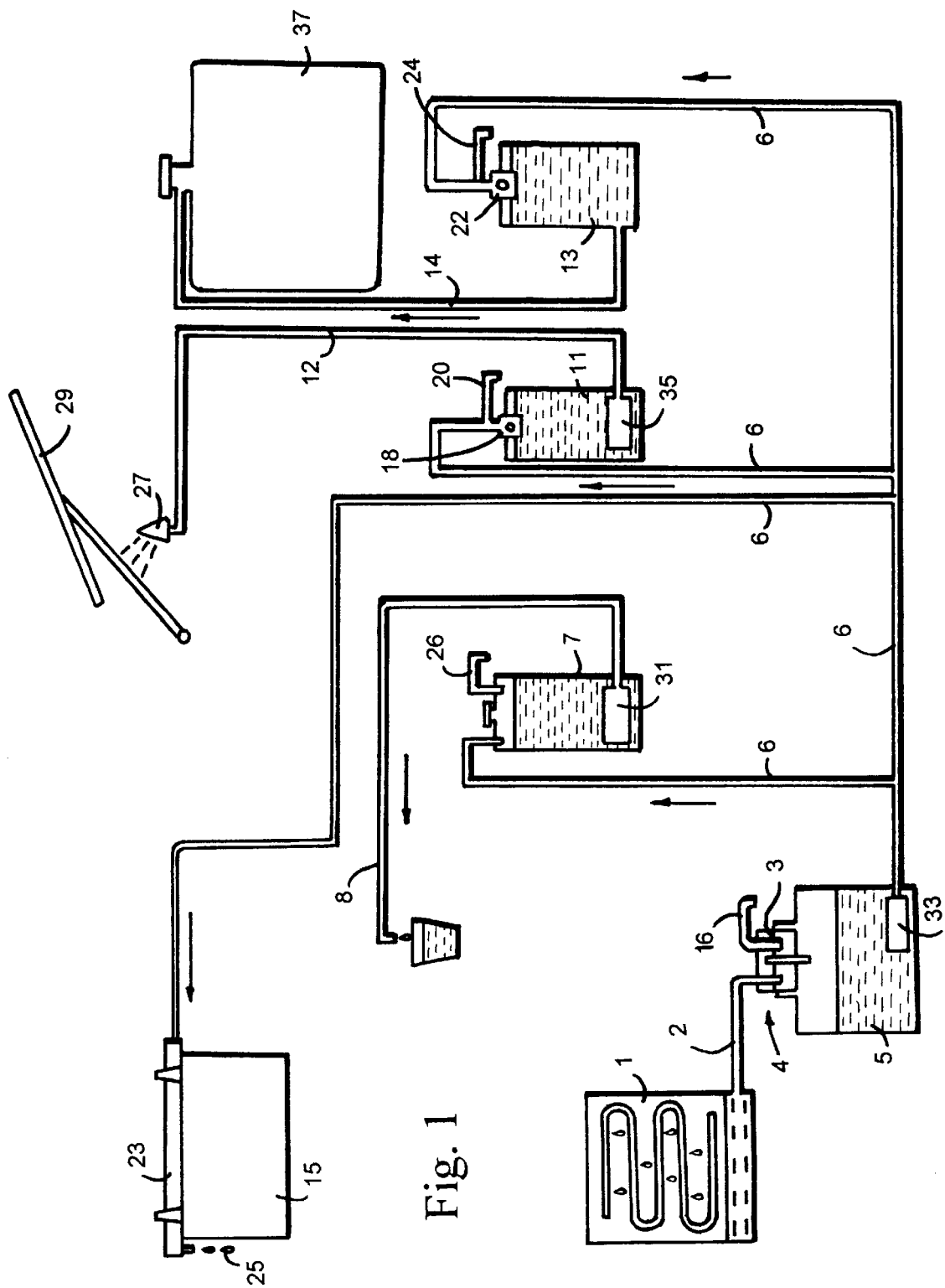
FIG. 1 is a schematic illustration of a water management system in accordance with the invention.

Referring to the drawings, and first FIG. 1, there is shown a water management apparatus for a motor car. The condenser unit 1 of the car's air-conditioning system serves as a source of water supply. Water generated in the condenser unit 1 is supplied to a central storage tank 5 via a pipe 2 and filter 3. The pipe 2 is connected to the drip outlet of the condenser unit 1. In this embodiment, the filter 3 is a mechanical filter for removing any dust, dirt or other solid contaminant from the collected water. The filter 3 is conveniently incorporated into the cap 4 of the tank 5. The cap includes an overflow outlet 16 for excess water to be discharged when the tank 5 is full.

Figure 3:
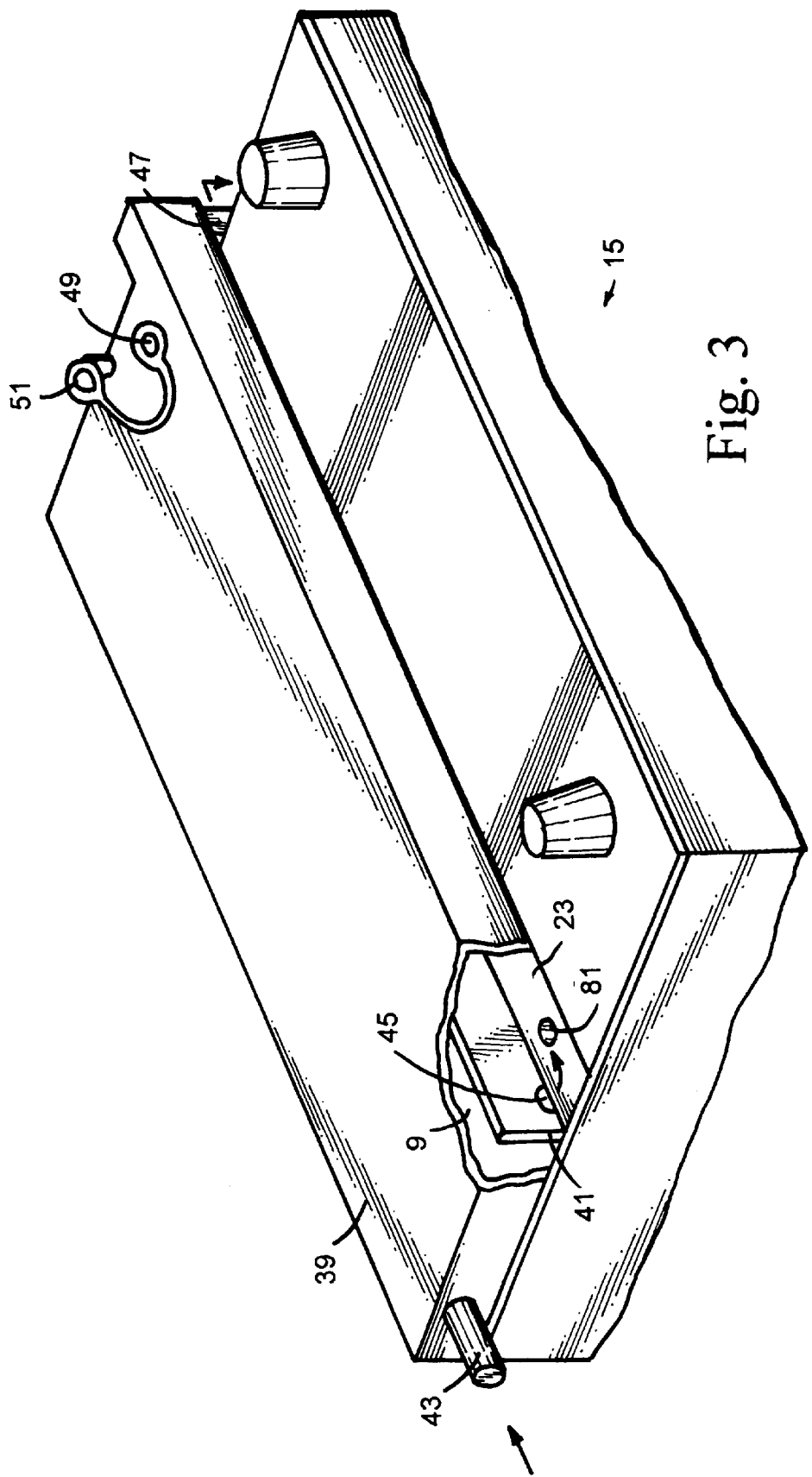
FIG. 3 shows an external view of the battery of FIG. 2(a).

The filtered water is fed from the tank 5, through piping 6, to a plurality of water storage tanks or bottles 7, 11, 13 and to a battery water reservoir 9 (see FIG. 3). For this purpose, a pump 33 is associated with the tank 5. The pump may be operated automatically or by means of a control within the vehicle in order to periodically top up the supplies 7, 9, 11 and 13.

A water reservoir 9, best seen in FIG. 3, is arranged for supplying water to the car's battery 15. The water in the reservoir 9 is allowed to drain, under the action of gravity, through a channel 23 which supplies water to the battery cells. Any excess or unrequired water 25 escapes at an outlet of the channel. The arrangement of the reservoir 9 and channel 23 for supplying water to the battery 15 will be described later with reference to FIGS. 2 and 3.

One water storage tank 11 is arranged for supplying water to a screen washer unit comprising one or more spray jets 27. In FIG. 1, the jet 27 is associated with a windscreen wiper 29. However, the jet may be equally provided for cleaning a rear window or a car light, especially a headlight. A pump 35, which is operated by means of a switch or lever on the dashboard or steering column, serves to supply water to the jet 27 through a pipe 12 in conventional manner.

The tank 11 may contain a cleaning agent. Water is fed into the tank 11 from the master tank 5 via a ball-valve 18 or the like. The valve 18 is closed when the tank 11 is full, so that any further water is discharged directly through an overflow 20. This arrangement ensures that there is no loss of cleaning agent when the tank 11 is full. Since the tank 11 is regularly filled with water from the master supply, its capacity can be made smaller than the conventional screen wash tank.

Another water storage tank 13 provides a supply of water for the radiator 37 of the engine's cooling system. Water is sucked up to the radiator 37 from the tank 13 through a pipe 14. A valve 22 and overflow outlet 24 arrangement, similar to that provided for the tank 11, ensure that any coolant agent contained in the cooling system is not lost when the tank 13 is full.

A further water storage tank 7 provides a supply of water for drinking, handwashing or the like by the driver and any passengers. A pump 31 serves to pump the water to an outlet through a pipe 8, when required. The outlet is preferably located in the car interior, although it may be located elsewhere, for example in the boot. An overflow pipe 26 discharges any excess water when the tank 7 is full.

Each of the pipes 2, 6, 8, 12 and 14 which interconnect the various components of the system, suitably consists of flexible tube or hose of rubber or other water-impermeable material.

The storage bottles 11, 13 and the battery 15 are preferably disposed in their normal positions within the engine compartment, that is in positions where they are accessible for inspection and the occasional addition of screen wash detergent or engine coolant. Therefore, fitting the water management system of the invention to an existing vehicle does not require extensive modification of the layout of the components of the engine compartment.

FIGS. 2(a)–(d) and 3 illustrate the construction of part of a wet battery in accordance with an independent aspect of the invention. In this specification, the term wet battery refers to a battery containing fluid which needs to be periodically topped up. Although the wet battery to be described is particularly suitable for use in the water management system of FIG. 1, it is not limited to such an application.

Referring first to FIG. 2(a), the battery 15 of this embodiment has six cells arranged in a linear array in conventional manner. For the purposes of illustration, only two of the cells 61, 63 are shown in full in FIG. 2(a). The other cells are the same. Each cell 61, 63 comprises a collection of plate-like electrodes 65 immersed in electrolyte fluid 67. A structural wall 69 separates, and isolates the fluid in, the adjacent cells.

The upper wall of each cell is defined by the bottom of the water channel 23, already mentioned with reference to FIG. 1. The channel 23 extends over the line of cells to allow water, or other fluid, flowing along the channel to enter the cells as required. For this purpose, the bottom of the channel includes two apertures for each cell. Referring to the enlarged view of FIG. 2(c), a first aperture serves as a gas vent, to permit gas or air to escape from the battery as required. The first aperture consists of a chimney-like structure 71, which extends to a level above the normal water level in the channel 23, thereby preventing unwanted entrance of water through the gas vent. Alternatively, the channel 23 may include an internal wall extending longitudinally therein to isolate the gas vents 71 from the water-receiving portion of the channel. A second aperture 81 serves as a water inlet for the cell, to permit water to enter the cell to top up the electrolyte level. This second aperture 81 consists of a hole surrounded internally by a cylindrical guide wall 73.

A float valve member 75 is disposed within each cell. The float valve member 75 has three main portions: a float portion 75a, a valve portion 75b, and a cup portion 75c. The float portion 75a extends laterally, suitably in a circular or rectangular shape, and floats on the surface of the battery fluid 67. The float portion 75a is suitably made of Styrofoam (trademark). The valve portion 75b, which is shown in detail in FIG. 2(b), extends vertically from the centre of the float portion 75a and is supported and guided by the guide wall 73. The distal end of the cylindrical valve portion 75b is terminated in a sealing disc 75j which internally engages the peripheral portion of the water inlet aperture 81 in a sealing manner when the valve is closed. The sealing disc 75j is made of a resilient and water-impermeable material. The use of silicone rubber for the sealing disc is presently preferred.

As best seen in FIG. 2(b), the valve portion 75b comprises a plurality of radial vanes 75d extending longitudinally and spaced circumferentially. The vanes 75d serve to locate the valve portion 75b centrally within the surrounding guide cylinder 73, and thereby form a plurality of passageways between the valve portion 75b and the inner surface of the wall 73. The passageways allow the free flow of water into the cell when the valve is open.

This preferred configuration also prevents the accumulation of dirt such as oxide particles on the valve portion 75b, and so ensures the free movement of the valve portion even when the fluid environment within the battery becomes contaminated as the battery ages.

Referring again to FIG. 2(b), the valve portion 75b further includes a mounting disc 75e which provides an annular flange. The portions of the vanes 75d below the disc 75e are adapted to be received in a lower cylinder 75h of the cup portion 75c.

Figure 2C:
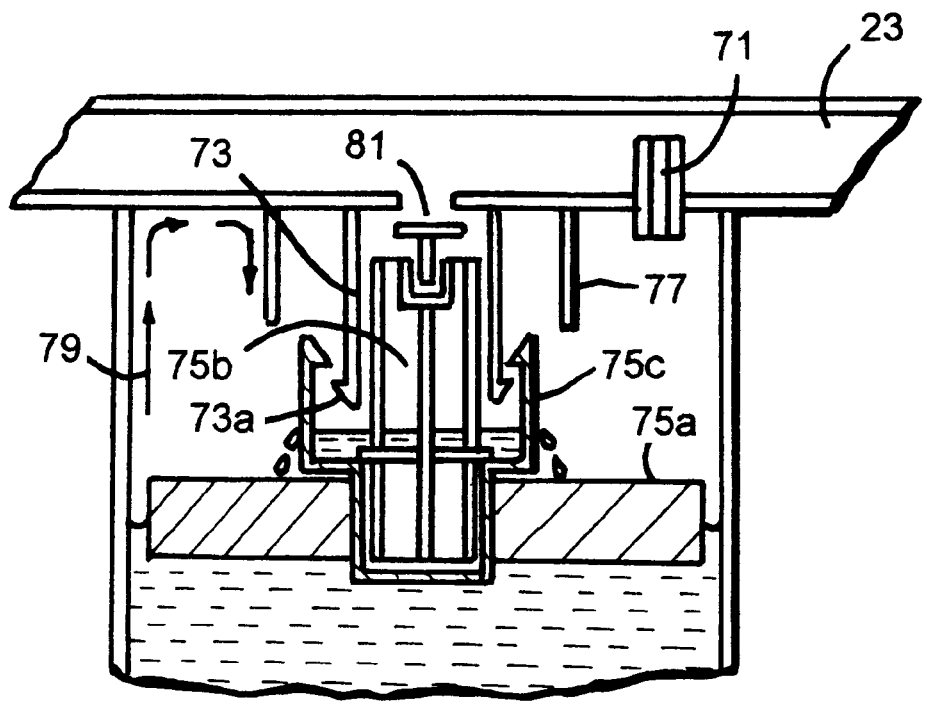
FIG. 2(c) is an enlarged view of the float valve of the battery of FIG. 2(a)
Figure 2D:
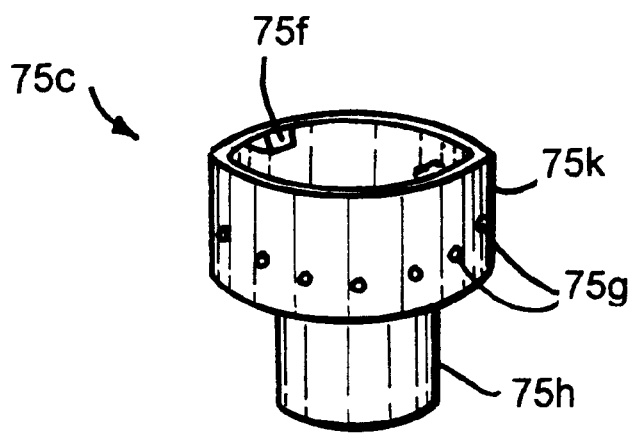
FIG. 2(d) shows another component of the float valve of the battery of FIG. 2(a)

FIG. 2(d) shows the cup portion 75c of the float valve member 75. This comprises an upper hollow cylindrical element 75k, which is open at the top end and has a diameter greater than that of the guide wall 73. The cup portion further comprises a lower hollow cylindrical element 75h of a diameter which is smaller than that of the upper element 75k and slightly greater than that of the valve portion 75b. The lower cylindrical element 75h is closed at its bottom end.

As best seen in FIG. 2(c), the lower element 75h accommodates the lower portion of the valve body 75b. The flange of the disc 75e is seated on the step which joins the upper and lower cylindrical elements 75k, 75h. The disc flange is preferably sealingly fixed to the step, for example by using adhesive.

The lower portion of the upper cylindrical element 75k includes a plurality of fluid holes 75g. The fluid holes 75g are formed in the cylinder wall, at a certain height above the step.

The vertical movement of the float valve member 75 is limited in the downward direction by interlocking of the cup portion 75c with the guide wall 73. For this purpose, in this embodiment, the lower end of the guide wall terminates in an annular lip 73a (see FIG. 2(c)), while the top, open end of the cup portion 75c includes a plurality of internal lugs 75f (see FIG. 2(d)). When the float valve member 75 drops below a predetermined level, the lugs 75f (there are two by way of example in the present embodiment) latch onto the guide wall lip 73a to arrest further downward movement. The vertical movement in the upward direction is limited by the engagement of the sealing disc 75j with the water inlet aperture 81 when the valve is in the closed state.

It will be noted that guide wall 73 and the wall of the upper element 75k of the cup portion form a continuous vertical barrier extending from the cell ceiling to the valve float portion 75a. This arrangement serves to prevent the escape of fluid from the cell (via the said second aperture), especially during vibration when the vehicle is in motion. Any fluid which does enter the cup portion will, however, flow out through the holes 75g therein when the fluid exceeds the level of those holes. As a further safeguard against the escape of fluid, a cylindrical baffle wall 77 extends vertically down from the cell ceiling to surround the upper part of the valve member 75. The arrows 79 indicate the function of the baffle wall 77 in deflecting any fluid that splashes upwards within the cell.

The inclusion of the cup portion 75c is optional, since the valve will operate without it. However, it is preferred for the reasons and advantages set out herein.

FIG. 3 is a perspective view of the top of the battery showing the channel 23 and reservoir 9 mentioned already with reference to FIG. 1. In this embodiment, the channel 23 and the reservoir 9 are formed as an integral box-like structure 39, which is conveniently made as a plastic moulding. An internal wall 41 divides the structure into the fluid reservoir 9 and the supply channel 23. The upper wall of the box may be removable or openable (not shown), especially over the channel 23 to permit inspection. The box is preferably also made of clear plastic for this purpose. The portion of the upper wall or lid over the channel encourages condensation of any battery fluid vapour escaping from the vents 71. The condensate usefully collects in the bottom of the channel and thus may reduce the amount of water that needs to be supplied from the reservoir.

Water is pumped into the reservoir 9 by the pump 33 (see FIG. 1) through an inlet 43 and enters the channel 23 therefrom via a port 45 formed in the wall 41. The water flows down the channel 23 and enters each cell of the battery whose fluid level is such that the float valve aperture 81 is open. Any excess water exits from the outlet 47, from where it may be wasted or returned to the reservoir 9 or tank 5. It is not essential to fill the reservoir 9 automatically. In an application where a water management system such as that shown in FIG. 1 is not employed, a manual filling port 49 and associated plug 51 can be provided. In that case, the inlet 43 is either plugged or not provided at all.

The reservoir 9, channel 23 and float valve members 75 may be constituted as a cover assembly to be fitted to the body of a conventional battery, thereby enabling the battery manufacturer to fabricate a battery in accordance with the invention without the need to re-design or re-tool the body of the battery.

In operation, water is fed into the channel 23 through the port 45 and travels down the channel toward the end having the outlet 47. For any cell of the battery in which the fluid level is below a predetermined value, the float valve member 75 will drop down to open a gap between the aperture 81 and sealing disc 75j. Thus, the water will enter this cell through the gap.

The water flows down between the guide wall 73 and the valve body 75b, enters the bottom of the cup 75c and exits through the fluid holes 75g, thereby topping up the cell fluid level. When the fluid level has risen again to the reference value, the float valve member 75 will also reside at a higher level to close the gap thereby preventing further water entry. The fluid level in each cell is self-regulated in this way. The cells may be topped up, as required, either in sequence or simultaneously, depending on the speed of the water flow through the channel. The water may be supplied to the channel 23 continuously or periodically. In the system of FIG. 1, the reservoir 9 is periodically charged, whether by manual instruction or automatically, and then allowed to empty over a short period, suitably a few minutes. This intermittent mode of operation is preferred to using a continuous flow of water. Especially, the intermittent flow of water can be generated when the vehicle is not in motion, which prevents accidental opening of the cell valves and unwanted entry of water due to vibration or shock.

The advantages of the described construction of the wet battery include the following. The provision of the common channel serving to supply the water to all the battery cells means that there is no need to interconnect the individual cell valves. Also, as compared with using a hose connection, the channel is easily accessible, less liable to blockage and simple to clean. Building the float valves into the structure of battery body enables each float member to occupy the full width of the cell. This improves the weight of the float valve member and the response to changes in the fluid level. The construction of the valves is simple and therefore of low cost, yet reliable. The water used to top up the cells does not need to be pressurised, nor supplied continuously.

The water management system of the invention is suitable for use on any vehicle including car, electric car, lorry, bus, train, boat, ship and various kinds of aircraft. Any one or more units requiring a water supply may be incorporated. It is not essential to supply water to the four units of the example, although in the case of the car, it is convenient to do so. Some modern vehicle batteries are completely sealed and do not require water top up. Here, the system remains suitable for any or all of the radiator, screen wash and drinking supplies. The wet battery of the invention has application in the above vehicles plus vehicles such as fork lift trucks and milk floats which use electrical power for their traction and/or other functions. The battery of the invention is equally useful in applications outside of the field of vehicles, such as emergency and stand-by power supplies.

What is claimed is:

1. A water management system on a vehicle, said vehicle including a plurality of units which require water for their operation, said system comprising water collecting means for providing a supply of water and distribution means for distributing water from said supply of water to said plurality of units, water supplied by said distribution means being used by said plurality of units in their said operation, wherein said water collecting means receives water from an air-conditioning system of said vehicle, said distribution means includes a respective water reservoir provided for each of said units, said water reservoir for storing water to be used by said unit, each said water reservoir having an overflow outlet for overflow of water when said reservoir is full, and wherein at least one said water reservoir has a one-way valve which directs water from said supply to said overflow outlet when said reservoir is full.

2. A water management system according to claim 1 wherein said units which require water for their operation include one or more of an engine cooling system of said vehicle, a washer unit for automatic washing of a window or light of said vehicle, a battery providing electricity for said vehicle, and a vehicle-based water supply.

3. A water management system according to claim 1 wherein said distribution means further comprises pump means for pumping water from said water collecting means to said water reservoirs.

4. A water management system according to claim 1 wherein said vehicle is an electric vehicle and said units include a bank of batteries providing electricity to generate motive power for said electric vehicle.

* * * * *